United States Patent [19]
Green et al.

[11] 3,747,213
[45] July 24, 1973

[54] SPRINKLER ANGULAR GRASS CUTTER

[76] Inventors: Irving C. Green, 212-1/2 El Tejon, Oildale, Calif. 93308; Joseph G. Rosales, 13513 S. Arcturus Ave., Gardena, Calif. 90249; John O. Elmore, 4242 Francis St., Chino, Calif. 91710

[22] Filed: July 26, 1971

[21] Appl. No.: 165,914

[52] U.S. Cl.................... 30/279 R, 30/287, 30/300
[51] Int. Cl............................................. B26b 27/00
[58] Field of Search....................... 30/263, 264, 276, 30/287, 300, 279 R; 172/15, 25

[56] References Cited
UNITED STATES PATENTS

| | | | |
|---|---|---|---|
| 2,583,113 | 1/1952 | Mogel | 30/276 |
| 3,057,064 | 10/1962 | Bertolino | 30/276 |
| 3,143,176 | 8/1964 | Drane | 172/25 X |
| 3,174,224 | 3/1965 | Rousselet | 30/264 |
| 3,555,680 | 1/1971 | Ford | 30/276 |

*Primary Examiner*—Robert C. Riordon
*Assistant Examiner*—J. C. Peters
*Attorney*—White, Haefliger & Bachand

[57] ABSTRACT

A device for trimming grass adjacent a sprinkler head comprises:
 a. an elongated upright shaft,
 b. a rotor carried at the lower end of the shaft and having an upright axis about which the rotor is rotatable,
 c. there being a guide at the underside of said rotor to embrace the sprinkler head, and
 d. the rotor carrying a series of downwardly presented cutters circularly spaced about said axis, the cutters tapering downwardly and inwardly toward a lower extension of said axis, whereby clippings trimmed by the cutters in response to rotor rotation are thrown upwardly through said spaces for outward discharge.

9 Claims, 5 Drawing Figures

PATENTED JUL 24 1973
3,747,213
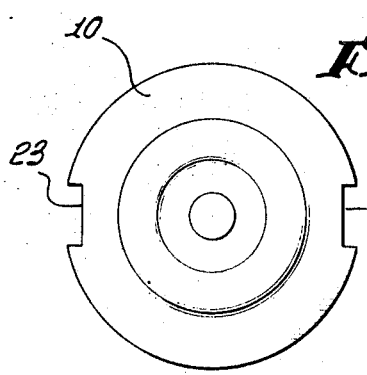
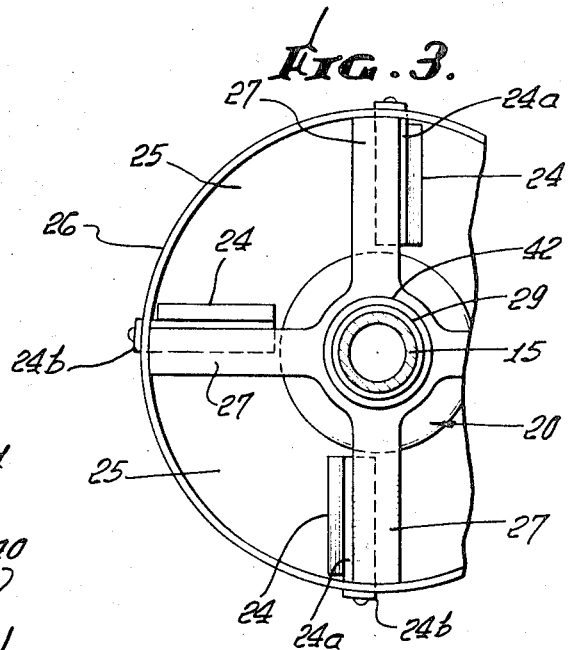
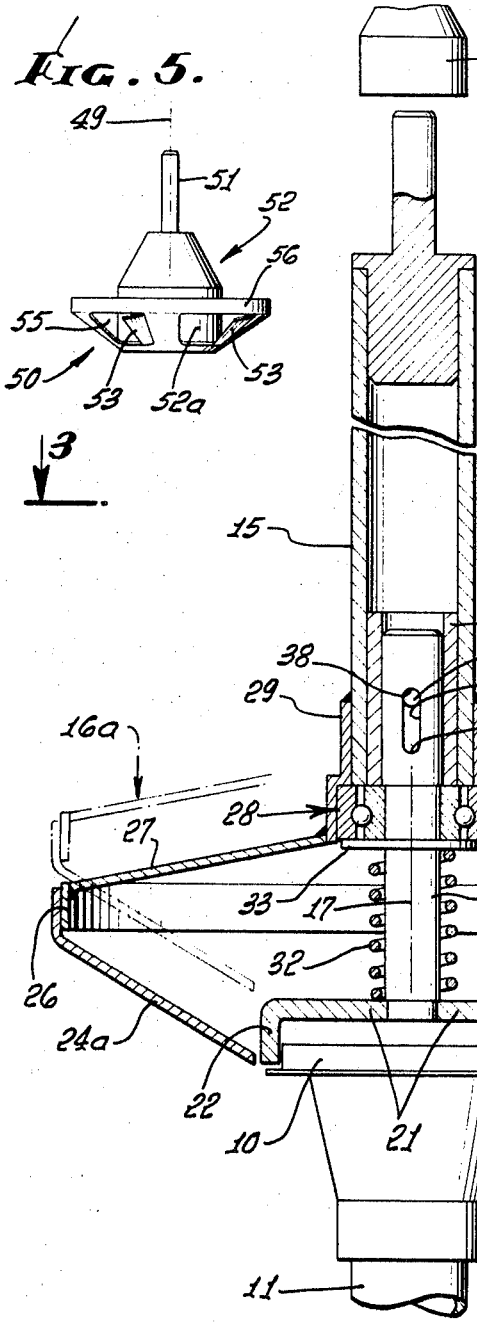
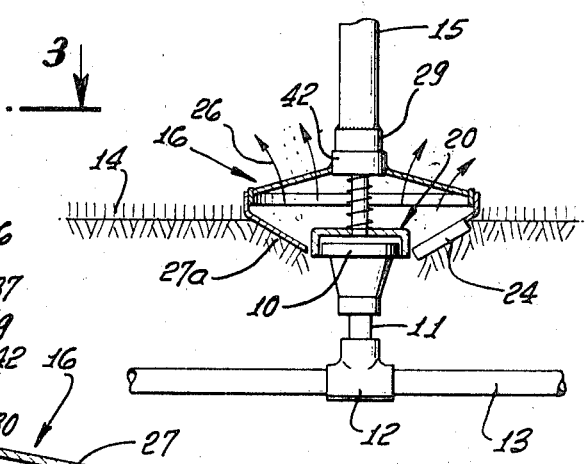
INVENTORS.
IRVING C. GREEN
JOSEPH G. ROSALES
JOHN O. ELMORE
BY
White, Haefliger & Bachand
ATTORNEYS.

SPRINKLER ANGULAR GRASS CUTTER

BACKGROUND OF THE INVENTION

This invention relates generally to lawn trimming, and more particularly concerns devices for trimming grass growing immediately adjacent sprinkler heads.

Lawn sprinkling systems commonly employ underground piping leading to sprinkler heads which proejct upwardly in the lawn area. While lawn mowers satisfactorily clip grass near the sprinkler head, their blades cannot reach into the lawn depression normally surrounding the head. Consequently, attempts have been made to design devices constructed to cut grass immediately surrounding the head. To our knowledge, none of such devices have embodied the unusually advantageous combinations and sub-combinations of construction features, modes of operation and results now afforded by the present invention, as will apear.

SUMMARY OF THE INVENTION

Basically, the invention is embodied in a device that comprises an elongated upright shaft; a rotor carried at the lower end of the shaft and having an upright axis about which the rotor is rotatable; there being a guide at the underside of the rotor to embrace the sprinkler head; and the rotor carrying a series of downwardly presented cutters circularly spaced about the axis, the cutters tapering downwardly and inwardly toward a lower extension of the axis. Accordingly, it is found that clippers may be rapidly trimmed with great precision to form an attractively desirable dish-shaped depression about the sprinkler head, the clippings are thrown upwardly and outwardly away from the so-formed depression, and the device accurately guides on the sprinkler head during its rapid rotation, which may be motor powered, such guiding comprising both centering and endwise locating.

Further, the guide may be carried for rotation relative to the rotor, and means to so carry the guide may include another shaft extending coaxially relative to the upright shaft and within the rotor, a bearing supporting that other shaft for rotation; additionally the guide may be supported for axial displacement relative to the rotor, a spring yieldably resisting such axial displacement, with tension sufficient to enable ready manual control of the depth of cutting by the cutters relative to the sprinkler head. Such control may thus be effected by simply pushing down on the upright shaft toward the guide embraced sprinkler head, all as will be seen.

These and other objects and advantages of the invention, as well as the details of an illustrative embodiment, will be more fully understood from the following description and drawings, in which:

DRAWING DESCRIPTION

FIG. 1 is a top plan view of a representative sprinkler head;

FIG. 2 is a side elevation, taken in section through a device incorporating the invention;

FIG. 3 is a fragmentary plan view taken on lines 3—3 of fFIG. 2;

FIG. 4 is a reduced elevation showing use of the device of the invention; and

FIG. 5 is an elevation showing a modification.

DETAILED DESCRIPTION

In FIGS. 1 and 4, a sprinkler head is shown at 10 as located at the upper end of a riser pipe 11 connected via tee 12 with horizontal pipe 13 underlying at lawn 14.

The representative device for trimming the grass adjacent the head comprises an elongated upright shaft, as for example may be tubular as indicated at 15 in FIG. 2. A rotor, such as at 16, is carried at the lower end of the shaft, the rotor having an upright axis 17 about which rotation occurs. That axis may be the same as the axis of shaft 15.

The device also includes a guide at the underside of the rotor to embrace the sprinkler head as the rotor rotates. In the example, the guide is in the form of a bracket or fork 20 having arms 21 extending laterally oppositely and terminating at downturned tangs 22 sized for reception in sprinkler head slots 23. As a result, the rotor may remain freely rotatable relative to the fixed head 10, while also being positively centered thereon in such a way that free rotation is not impeded.

The rotor 16 carries a series of downwardly presented cutters, as for example may be formed as at 24, to be circularly spaced about axis 17. The cutters may, with unusual advantage, taper downwardly and inwardly toward a lower extension of the axis 17, whereby clippings trimmed by the cutters in response to rotor rotation are thrown upwardly through the spaces 25 between the cutters and then outwardly, as for example is indicated by the arrows 26 in FIG. 4. Thus, the dished depression accurately formed at 27 a about the sprinkler head 10 is scavenged of clippings and other debris clipped and deflected upwardly and outwardly by the whirling blades. In this regard, the blades or cutters may be formed on arms 24a projecting from supporting terminals 24b suitably attached to ring 26 carried by spider arms 27 above the blades. The inner ends of those arms are carried as by a sleeve 42 confining bearing 28. The outer race of the latter and sleeve 42 are suitably integrally carried at the lower end of the shaft 15, as for example by a fastening sleeve 29.

Support means may also be carried by shaft 15 to support the guide 20 for rotation relative to the rotor. Such support means may advantageously comprise another shaft, as for example, at 30, extending coaxially relative to shaft 15 and within the rotor 16. The support means may also be considered to include the bearing 28 which centers the shaft 30 for rotation relative to the rotor. Thus, the shaft may be centered by the inner race of the bearing.

Such support means may additionally support the guide 20 for axial displacement relative to the rotor, and in this regard, the rotor may initially have the relative position as indicated by the broken lines 16a, with guide 20 having the FIG. 2 position as shown as it embraces head 10. Thereafter, the rotor 16 may be advanced downwardly to the full line position shown, for progressively trimming grass to an accurate dish-shape terminating at the periphery of the head 10. Cuttings and debris are also removed, as described.

A spring may be provided to yieldably resist such axial downward displacement of the rotor (i.e. relative upward axial displacement of the guide 21 toward the shaft), for enabling manual control of such progressive cutting and debris removal. That spring may be of coil type, and fitted around shaft 30 as shown at 32, the spring ends confined between the top of the guide 20 and the underside of a washer 33 directly below the bearing.

Finally, stop means may be provided to limit such relative downward displacement of the rotor, to thereby limit the depth of cutting relative to head 10. An example of such stop means includes the transverse pin 35 carried by the internal sleeve 36 rotatable in tubular shaft 15, that pin extending through the longitudinal slot 37 cut through shaft 30. The upper and lower ends of the slot terminate at shoulders 38 and 39 which engage the pin to limit up and down relative movement of the shafts 15 and 30.

The upper end of shaft 15 carries a connection 40 which may receive a power unit drive element 41 for rotating shaft 15. Thus, the operator may position the shaft 15 so that guide 20 fits on a sprinkler head; then he may connect element 41 on the connection 40 to rotate the rotor as he pushes downwardly against the spring to effect controlled progressive trimming about the sprinkler. The stop means limits downward stroking at the predetermined "finished" trimming condition seen in FIG. 4, at which time all cuttings and loose debris have been thrown clear of the sprinkler head periphery. Thereafter, the device may be lifted free of the sprinkler.

In FIG. 5, a rotor 50 is carried at the lower end of shaft 51, these having a common axis 49 of rotation. The rotor is carried by a hollow hub or body 52, the lower portion 52a of which is tubular to closely receive a sprinkler head, for guiding the rotor relative to the head as the shaft, body and rotor are rotated.

The rotor 50 includes a circular series of downwardly presented cutters 53 which are circularly spaced about axis 49. The cutters taper downwardly and inwardly toward the body 52 to which they are connected, whereby clippings trimmed by the cutters are thrown upwardly through spaces 55 between the cutters and then outwardly. A ring 56 interconnects the upper portions of the cutters, for rigidity of the assembly.

Finally, the internal bore diameters of guide 20 and sleeve or body 52 may be variously sized to accommodate different sprinkler head diameters, from 1 7/8 inch to 2 ⅝ inch.

We claim:

1. In a device for trimming grass adjacent a sprinkler head, the combination comprising;
   a. an elongated upright shaft,
   b. a rotor carried at the lower end of the shaft and having an upright axis about which the rotor is rotatable,
   c. there being a guide at the underside of said rotor to embrace the sprinkler head, and
   d. the rotor carrying a series of downwardly presented cutters circularly arranged about said axis to define spaces therebetween, the cutters tapering downwardly and inwardly toward a lower extension of said axis, whereby clippings trimmed by the cutters in response to rotor rotation are thrown upwardly through said spaces for outward discharge, the rotor including a ring rigidly interconnecting the outermost and uppermost ends of the cutters, the ring operatively connected with the shaft.

2. The combination of claim 1 including a connection at the upper end of the shaft to removably receive a power unit drive for effecting rotor rotation.

3. The combination of claim 1 wherein said guide is carried for rotation relative to the rotor.

4. The combination of claim 3 including support means carried by the shaft and supporting said guide for said relative rotation.

5. The combination of claim 4 wherein said support means includes another shaft extending coaxially relative to said upright shaft and within said rotor, and a bearing supporting said other shaft for said relative rotation.

6. In a device for trimming grass adjacent a sprinkler head, the combination comprising:
   a. an elongated upright shaft,
   b. a rotor carried at the lower end of the shaft and having an upright axis about which the rotor is rotatable,
   c. there being a guide at the underside of said rotor to embrace the sprinkler head,
   d. the rotor carrying a series of downwardly presented cutters circularly arranged about said axis to define spaces therebetween, the cutters tapering downwardly and inwardly toward a lower extension of said axis, whereby clippings trimmed by the cutters in response to rotor rotation are thrown upwardly through said spaces for outward discharge, and
   e. support means carried by the shaft and suppporting said guide for said relative rotation, said support means including another shaft extending coaxially relative to said upright shaft and within said rotor, and a bearing supporting said other shaft for said relative rotation, said support means also supporting said guide for axial displacement relative to said rotor.

7. The combination of claim 6 including a spring carried to yieldably reist relative axial displacement of said guide in a direction toward said upright shaft and relative thereto.

8. The combination of claim 5 wherein said shaft is carried for axial displacement relative to said upright shaft, and including a coil spring extending about said other shaft and within the rotor to yieldably resist axial displacement of the guide in a direction toward said upright shaft.

9. The combination of claim 8 including stop means limiting said relative axial displacement of said other shaft in opposite endwise direction, thereby to limit the depth of cutting of said cutters relative to the sprinkler head.

* * * * *